(12) United States Patent
Ishii

(10) Patent No.: US 7,312,826 B2
(45) Date of Patent: Dec. 25, 2007

(54) DIGITAL CAMERA APPARATUS WITH HIGH SPEED IMAGING AND ENERGY SAVING FEATURES

(75) Inventor: Akihiro Ishii, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 525 days.

(21) Appl. No.: 10/179,459

(22) Filed: Jun. 24, 2002

(65) Prior Publication Data

US 2003/0043291 A1 Mar. 6, 2003

(30) Foreign Application Priority Data

Sep. 5, 2001 (JP) .............................. 2001-268907

(51) Int. Cl.
H04N 3/14 (2006.01)
H04N 5/335 (2006.01)
H04N 5/225 (2006.01)
(52) U.S. Cl. ..................... 348/312; 348/294; 348/372
(58) Field of Classification Search ................. 348/312, 348/333.13, 362, 294, 303, 296, 372; 399/37; 396/301, 302, 303; 250/208.1
See application file for complete search history.

(56) References Cited

U.S. PATENT DOCUMENTS

| | | | | |
|---|---|---|---|---|
| 4,831,406 A | * | 5/1989 | Seki et al. .................... | 396/301 |
| 5,032,864 A | * | 7/1991 | Ishimura et al. ............. | 396/302 |
| 5,136,327 A | * | 8/1992 | Ogawa ......................... | 396/280 |
| 5,389,998 A | * | 2/1995 | Dunsmore et al. ........... | 396/301 |
| 5,655,163 A | * | 8/1997 | Tsukahara et al. ........... | 396/287 |
| 5,680,594 A | * | 10/1997 | Charneski et al. ........... | 713/501 |
| 5,777,671 A | * | 7/1998 | Maki et al. ................... | 348/312 |
| 6,016,407 A | * | 1/2000 | Tsukahara .................... | 396/302 |
| 6,441,854 B2 | * | 8/2002 | Fellegara et al. ........ | 348/333.13 |
| 6,888,574 B1 | * | 5/2005 | Asakura ....................... | 348/372 |
| 2002/0003579 A1 | * | 1/2002 | Inagaki ......................... | 348/312 |

FOREIGN PATENT DOCUMENTS

JP 2000-059675 2/2000

* cited by examiner

Primary Examiner—Ngoc-Yen Vu
Assistant Examiner—Gregory V Madden
(74) Attorney, Agent, or Firm—Hogan & Hartson LLP

(57) ABSTRACT

A digital camera 10 includes a systems control section 20. When the systems control section 20 receives any of operation signals from a key operation section 18, the systems control section 20 measures the passage of time with a timer 22, and continues the time measurement for a specified period of time until any of the operation signals is supplied. In an imaging mode, the system controls section 20 generates an oscillation frequency higher than a normal oscillation frequency with a signal generation circuit 260 in response to a button depressing operation of a release shutter button 180, and generates the normal oscillation frequency upon receipt of any one of the operation signals in a specified period of time. The system controls section 20 continues monitoring the operation signals and generates an oscillation frequency lower than the normal frequency to thereby control to lower the power consumption depending on the result of the measurement of the passage of the specified period of time by the timer 22.

6 Claims, 2 Drawing Sheets

| Power Supply SW | Mode Selection SW | Release Shutter Button | Operation Status and Mode | | | |
|---|---|---|---|---|---|---|
| OFF | — | — | Power Supply Off | | | |
| ON | Reproduction | — | Energy Saving Mode | | | |
| | | | Not Set | Set | | |
| | Imaging | No Depression | Energy Saving Mode after a specified amount of time elapses | Energy Saving Mode | | |
| | | | | Imaging preparation Mode | | |
| | | Full Depression | Imaging Sequence Starts | Imaging Sequence starts after Power Supply resumes | | |

Fig. 2

DIGITAL CAMERA APPARATUS WITH HIGH SPEED IMAGING AND ENERGY SAVING FEATURES

BACKGROUND OF THE INVENTION

1. Field of the Invention

The present invention relates to a digital camera device, whose ideal application is a digital camera with a pan focus function or a toy digital camera.

2. Description of Related Art

Digital cameras are devices that convert incident lights into electrical signals and record the image data obtained from the conversion. These cameras are known to consume large amounts of power in order to satisfy the demand for high-speed drive and to have an image display function. In addition, it is generally considered desirable for these cameras to be compact and lightweight so that they can be portable. Consequently, the digital cameras use high-performance batteries and various ingenious ideas are employed to extend their operational time.

In a conventional digital still camera device, the device's operational state is determined with an operational state determination device based upon the status of a mode selection device that selects the operational mode, the status of a power source switch device and the status of a shutter switch device; a continuous operational time in the operational mode as determined is measured with a measuring device; and when it is determined that the predetermined amount of time for each operational state has been exceeded a power saving device turns off power to every part of the device except a control system and the device goes into a power saving mode and thereby manages to save power in every situation. Furthermore, the power is turned on in appropriate operational states for a faster shooting startup.

In supplying power adequately according to the operational state, a clock in the control system to which power is supplied is at a frequency lower than its normal frequency in the energy saving mode. When a preliminary imaging is done by half depressing the release shutter button in the energy saving mode followed by an actual imaging, the timing to photograph the subject is sometimes missed.

SUMMARY OF THE INVENTION

The present invention solves such a shortcoming of the prior art described above, and provides a digital camera device that would not miss the timing to photograph the subject while minimizing the power consumption.

In accordance with an embodiment of the present invention, there is provided a digital camera in which the timing to take in incident light from a field is made to correspond to an operation of a shutter button by an operator in order to convert the incident light into an electrical signal, the electrical signal is output as an imaging signal, and image data obtained by digitizing the imaging signal are rendered a signal processing, the digital camera comprising: an operating device that operates the camera including the shutter button; a clock generating device that generates a plurality of oscillation frequencies each corresponding to an operation of the operating device; a time measuring device that measures time depending on the operation resulting from the operator operating the operating device; and a systems control device that determines an operational state of the camera based on whether or not operation signals that indicate operations of the operating device are present and that controls the clock generating device and the power supply of the camera, accordingly, wherein the systems control device performs a control to generate, in an imaging mode that includes a sequence to output imaging signals and in response to a depressing operation of the shutter button, an oscillation frequency higher than a normal oscillation frequency from among the plurality of oscillation frequencies generated by the clock generating device, a control to generate the normal oscillation frequency within a predetermined amount of time, and a control to generate a frequency lower than the normal oscillation frequency while continuing monitoring the operation signals depending on the result of measuring the passage of a predetermined amount of time with the time measuring device.

The digital camera device according to the present invention is operated through: receiving in the systems control device an operation signal from the operating device; measuring the passage of a predetermined amount of time until the operation signal is supplied while measuring time with the time measuring device; controlling the clock generating device to generate an oscillation frequency higher than normal in response to the pressing operation of the shutter button in the imaging mode; supplying the oscillation frequency generated to the systems control device; performing a control to generate a normal oscillation frequency within the predetermined amount of time; continuing to monitor the operation signal depending on the result of measuring the passage of predetermined amount of time with the time measuring device; and at the same time controlling to generate a frequency lower than the normal oscillation frequency and reducing the power supply. As a result, the digital camera device according to the present invention precisely images an imaging scene desired by the operator and controls the power supply, while increasing the operation speed of the camera according to the pressing operation of the shutter button.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 2 shows a table showing the settings of the key operation section and the relationship between various camera operations and modes.

PREFERRED EMBODIMENTS OF THE INVENTION

Figure 1:
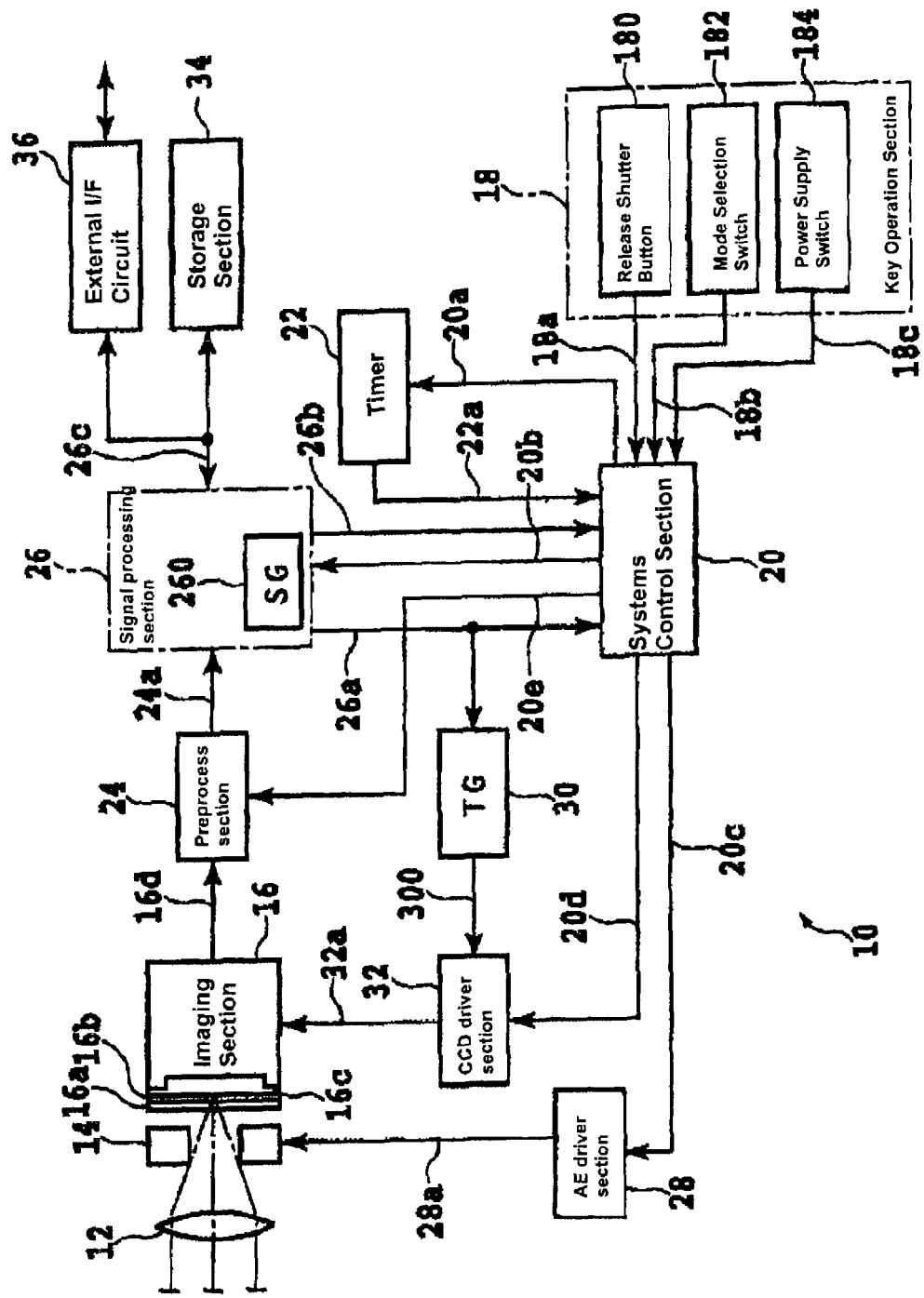
FIG. 1 schematically shows a block diagram of a structure of a camera in which a digital camera apparatus according to an embodiment of the present invention is applied.

Next, a digital camera device in accordance with an embodiment of the present invention will be described in detail with references to the accompanying drawings.

In the present embodiment, the digital camera device is applied to a toy type digital camera 10 (hereinafter called the "digital camera 10"). Parts that are not directly related to the present invention are omitted from drawings as well as their description. Numbers assigned to various signals correspond to the numbers assigned to connection lines on which the various signals appear.

The digital camera 10 includes an optical lens system 12, a diaphragm mechanism 14, an imaging section 16, a key operation section 18, a systems control section 20, a timer 22, a preprocessing section 24, a signal processing section 26, an AE (automatic exposure) drive circuit 28, a timing signal generating (TG: timing signal generator) section 30, a CCD (charge coupled device) drive circuit 32, a storage section 34 and an external IF (interface) circuit 36.

The optical lens system 12 is structured, for example, by combining a plurality of optical lenses and designed so that an incoming light flux forms an image by focusing on the imaging section 16 via an iris comprising the diaphragm mechanism 14. The optical lens system 12 can be configured to pan focus, whereby it fixes its focus in a broad range on everything from a subject to the background, although this function is omitted from the drawings. Additionally, the optical lens system 12 may include an AF (auto focus) adjustment mechanism, which finds the distance between the subject and the digital camera 10 during a preliminary imaging before an actual imaging and adjusts the focus depending on the distance, and an AE adjustment mechanism, which adjusts the amount of incident light. These mechanisms respond to a drive signal supplied from a drive circuit described later.

The diaphragm mechanism 14 rotates a ring section depending on the drive signal provided from a diaphragm drive circuit, although this detail is omitted from the drawings. In the ring section, blades partially overlap each other to form an iris in a circular shape that allows light beams to enter. The diaphragm mechanism 14 changes the aperture of the iris in this way. A mechanical shutter (omitted from drawings) as a lens shutter may be assembled into the diaphragm mechanism 14.

The imaging section 16 includes an optical low pass filter 16a, a color filter 16b and solid imaging elements 16c. The optical low pass filter 16a is a filter to render a spatial frequency of an incident light at or below the Nyquist frequency. The color filter 16b is a filter in which its color filter segments comprising the three primary colors RGB are laid out in predetermined positions in a one to one relationship with each imaging element of the solid imaging elements 16c. Consequently, the color filter 16b is dependent on the layout of imaging elements of the solid imaging elements 16c. If the solid imaging elements 16c are in a staggered pixel layout, i.e., a honeycomb layout, a G in the square and RB in the fully checkered pattern, for example, is used. The color filter 16b is not limited to the one with the three primary colors RGB and may be one with color filter segments of complementary colors. However, in this case a process to convert complementary colors into primary colors will be added in a signal processing step to be performed later.

The solid imaging elements 16c may be a charge coupled device (CCD) type or a metal oxide semiconductor (MOS) type. In the present embodiment, the CCD type is used, and the solid imaging elements 16c generate a signal charge by photoelectrically converting an incident light that has passed through the optical lens system 12 and the iris of the diaphragm mechanism 14. Although omitted from drawings, the imaging elements are arrayed with a pitch that is defined by the distance between pixels in vertical and horizontal directions, in which pixels of adjacent elements are half a pitch staggered from each other in vertical and horizontal directions. A vertical transfer register that transfers signal charges in the vertical direction in accordance with this layout is formed to circumvent adjacent elements and is therefore formed in a meandering or zigzag manner.

A horizontal transfer register is formed in a direction orthogonal to the vertical transfer register. The horizontal transfer register transfers the signal charge supplied towards an output amplifier. The output amplifier converts the signal charge (Q) into voltage (V) and outputs it. The solid imaging elements 16c, in response to the drive signal supplied from a CCD drive circuit to be described later, actually become exposed to the incident light, transfer the signal charge and reset elements. The imaging section 16 outputs an imaging signal 16d to the preprocessing section 24.

The key operation section 18 includes a release shutter button 180, a mode selection switch 182 and a power source switch 184. The release shutter button 180 supplies a timing signal 18a, which indicates what the imaging timing is, to the systems control section 20. In the toy type digital camera according to the present embodiment, the release shutter button 180 has only a single stroke (full depression). Consequently, in the release shutter button 180 in the toy type digital camera, a half depression for preliminary imaging (S1) and a full depression (S2) for actual imaging take place at the same time. The status of the release shutter button 180, i.e., a state in which the release shutter button 180 is not pressed or a state in which the release shutter button 180 is pressed, is notified to the systems control section 20 as the timing signal 18a depending on the operation.

The mode selection switch 182 supplies to the systems control section 20 a mode signal 18b that indicates which mode has been selected for the digital camera 10. The mode selection switch 182 has at least an imaging mode. The mode selection switch 182 may also have a reproduction mode. In the reproduction mode, the digital camera 10 reproduces the image data already recorded. However, in the digital camera 10, which is a toy type digital camera according to the present embodiment, there is no liquid crystal display section installed on the camera itself. It is known that in digital cameras the liquid crystal display section consumes an extremely large amount of power. In the reproduction mode, the image data are output to an external monitor (omitted from drawings) to be displayed.

The power source switch 184 supplies to the systems control section 20 a selection signal 18c that indicates whether to supply or cut off power from a battery, omitted from drawings, to the digital camera 10.

The systems control section 20 is a microcomputer or a CPU (central processing unit) that controls the general purpose parts of the entire camera and the parts that perform digital processing. The systems control section 20 receives as trigger signals the timing signal 18a, the mode signal 18b and the selection signal 18c supplied from the key operation section 18; and taking into account the status of these trigger signals received, the systems control section 20 supplies to the timer 22 a time measure start signal 20a when the operation section 18 is operated.

In addition to controlling the preprocessing section 24, the signal processing section 26, the AE drive circuit 28 and the CCD drive circuit 32, the systems control section 20 also controls the storage section 34 and the external IF circuit 36, although the control over the last two by the systems control section 20 is omitted from drawings. When imaging, in response to having the release shutter button 180 fully depressed in the imaging mode, the systems control section 20 supplies a control signal 20b to the signal processing section 26. When this happens, the control signal 20b is supplied as a signal to instruct a signal generating circuit 260 within the signal processing section 26 to supply a frequency higher (an integral multiple of a reference clock) than the normal oscillation frequency from among a plurality of clock signals. In the imaging mode, the systems control section 20 does not execute any control over the external IF circuit 36.

A clock signal 26a supplied from the signal generating circuit 260 is supplied to the systems control section 20. In addition, information 26b regarding various parameters found by the signal processing section 26 is also supplied to the systems control section 20. The systems control section 20 supplies control signals 20c and 20d, which correspond to various parameters, to the AE drive circuit 28 and the CCD drive circuit 32, respectively, to cause certain operations to take place based upon the clock signal 26a. Furthermore, the systems control section 20 supplies a control signal 20e to the preprocessing section 24 in order to execute a gain adjustment of the imaging signal.

Moreover, the systems control section 20 reduces the oscillation frequency of the clock signal 26a in a shoot preparation mode or an energy saving mode, both described later, while also controlling to limit the power supply destinations depending on the mode. In the shoot preparation mode, the systems control section 20 supplies power to circuits related to imaging and performs key scanning, i.e., checks whether any key operations have been performed, while monitoring the power supply. The systems control section 20 performs this monitoring in the energy saving mode also but only performs key scanning and turns off the power supply to other circuits.

The timer 22 has a function to measure the passage of time in which no operation takes place continuously, such time being predetermined for each mode. The control signal 20a supplied from the systems control section 20 to the timer 22 is used as a trigger signal to reset the timer and start measuring time when there is a key operation of some sort by an operator at the key operation section 18. The timer 22 can be set for each operational mode, and when the set time has passed it outputs a no operation sensor signal 22a that informs the systems control section 20 that the set time has passed.

Although omitted from drawings, the preprocessing section 24 includes a correlated double sampling (CDS) circuit, an automatic gain control (AGC) amplifier and an A/D converter (ADC: analog to digital converter) section. Upon receiving the control signal 20e from the systems control section 20, the preprocessing section 24 operates according to various timing signals (omitted from drawings) supplied from the timing signal generating section 30.

The correlated double sampling circuit reduces low frequency noise components contained in the imaging signal 16d supplied. The noise-reduced signal is waveform-shaped by undergoing amplification on the AGC amplifier according to the control signal 20e. The A/D converter section converts an analog signal supplied into a digital signal 24a and outputs it to the signal processing section 26.

The signal processing section 26 is a section that processes image signals and comprises an RISC (reduced instruction set computer) chip. Inside the chip are a memory, a gamma correction circuit, an evaluation value calculation section, a pixel interpolation processing circuit, a color difference matrix processing circuit and a compression/expansion processing circuit, all omitted from the drawings, in addition to the signal generating (SG) circuit 260.

The control signal 20b is supplied from the systems control section 20 to the signal processing section 26, and the signal generating circuit 260 operates in response to the control signal 20b. The signal generating (SG) circuit 260 has a PLL (phase locked loop) circuit that can generate a plurality of frequencies. The signal generating circuit 260 uses the original source oscillation frequency as the reference clock and multiplies it in integral multiples to generate a plurality of types of the clock signal 26a. The signal generating circuit 260 generates the reference clock used in the energy saving mode, the normal oscillation frequency used in the shoot preparation mode, and the frequency for actual imaging mode that is higher than the normal oscillation frequency. The signal generating section 260 can set the original source reference clock at a high frequency and divide the frequency of the reference clock, but this is not desirable in terms of power consumption since it entails a constant generation of a high frequency reference clock.

The memory receives inputs of image data 24a that have been converted into digital data, temporarily stores them, and outputs them as image data to the gamma correction circuit. When reading repeatedly, it is desirable to use a nonvolatile memory. The gamma correction circuit includes a look up table for gamma correction, for example. As one of the preprocessing procedures in image processing, the gamma correction circuit uses the data on the look up table to perform gamma correction on the image data supplied. The gamma correction circuit supplies the gamma-corrected image data to both the evaluation value calculation section and the pixel interpolation processing circuit.

The evaluation value calculation section includes an operational circuit to calculate a diaphragm value/shutter speed, white balance (hereinafter called WB) adjustment value and gray scale correction value. The evaluation value calculation section uses operational processing in the operational circuit to calculate various appropriate parameters based on the image data supplied. The results of the calculation are supplied as a parameter 26b to the systems control section 20.

The evaluation value calculation section does not have to be installed inside the signal processing section 26 and can be installed in the systems control section 20. In this case, the signal processing section 26 supplies the gamma-corrected image data to the systems control section 20.

The pixel interpolation processing circuit has a function to interpolatedly generate and calculate pixel data and a function to make the pixel data generated compatible with broadband. Due to the fact that the imaging section 16 uses a single plate color filter 16b, colors other than the colors of the actual color filter segments cannot be obtained from the imaging elements. The pixel interpolation processing circuit generates by interpolation the pixel data of colors that cannot be obtained. Further, it uses the pixel data generated that includes the colors originally obtained to achieve higher frequency, i.e., to perform a broadband processing. The pixel interpolation processing circuit supplies plain broadband image data to the color difference matrix processing circuit.

When the solid imaging elements 16c in the imaging section 16 are in a honeycomb type, the pixel interpolation processing circuit uses the gamma-corrected image data to generate, through interpolation processing, pixel data in three primary colors RGB in positions where pixels actually exist (real pixels) and positions where pixels do not exist (virtual pixels).

The color difference matrix processing circuit generates a brightness data Y, and color data Cb and Cr from the image data. The image data generated are supplied to the compression/expansion processing circuit.

The compression/expansion processing circuit uses JPEG (Joint Photographic Coding Experts Group) standard, for example, to render compression processing on the image data (Y/C) supplied in the actual imaging mode. The compression/expansion processing circuit sends to and records on the storage section 34 image data 26c compressed after the actual imaging, and outputs them on a monitor, omitted from drawings, via the external IF circuit 36. The compression/expansion processing section reads the image data 26c recorded on the storage section 34 and expands them. The expansion processing is the reverse of the compression processing. The expanded image data (Y/C) 26c are supplied to the external IF circuit 36 and an image signal 36a reproduced is displayed on the monitor.

In order to eliminate any discrepancies between the predetermined target diaphragm value and the photometric value of the parameters related to exposure, the AE drive circuit 28 supplies a drive signal 28a that in response to the control signal 20c causes the ring section to rotate.

Based on the clock signal 26a supplied from the signal generating circuit 260, the timing signal generating circuit 30 generates various timing signals such as a horizontal synchronizing signal, a vertical synchronizing signal, a field shift gate pulse, a horizontal transfer signal and a vertical transfers signal. The timing signal generating circuit 30 supplies a timing signal 300 generated to the CCD drive circuit 32.

The CCD drive circuit 32 controls the exposure time, reads onto a transmission line a signal charge generated through photoelectric transfer and supplies a drive signal 32a to the imaging section 16 to have the signal charge transferred in vertical and horizontal directions.

The storage section 34 uses a semiconductor memory as a recording medium and records the image data 26c supplied. Optical disks and/or magnetic optical disks can also be used as the memory medium.

The external IF circuit 36 has interface functions to output to the outside the image data and/or digital data supplied and to read data input from the outside. The external IF circuit 36 manifests these functions in the reproduction mode in the present embodiment. The external IF circuit 36 has interfaces based on PIO (program input/output), UART (universal asynchronous receive-transceiver), USB (Universal Serial Bus), IEEE1394 standard (The Institute of Electrical and Electronics Engineers), for example.

PIO is an interface section that can change input and output through programs. UART is a device used in serial interfaces. This device has a function to convert a parallel signal supplied into a serial signal or to convert a serial signal sent from a serial device into a parallel signal. An IEEE1394 standard interface, for example, supports data transfer of up to 400 Mbps.

Although the digital camera 10 according to the present embodiment is described above as not having an image display section, a liquid crystal display may be mounted. However, in this case the digital camera 10 will be controlled in such a way that power supply is turned off in the energy saving mode to minimize power consumption.

In a camera with the structure described above, the operation speed can be increased by supplying in the imaging mode a higher than normal clock frequency, so that the imaging scene can be imaged without being missed.

Next, the operational mode of the digital camera 10 will be described (see FIG. 2). The operational mode is determined by inputting into the systems control section 20 the timing signal 18a, the mode signal 18b and the selection signal 18c, which indicate the operational status of the release shutter button 180, the mode selection switch 182 and the power source switch 184, respectively, of the key operation section 18. The systems control section 20 changes the mode depending on the result of the determination. First, regardless of the status of the release shutter button 180 and of the mode selection switch 182, if the power source switch 184 is off, the camera 10 goes into a power off state.

Next, when the power source switch 184 is turned on and if the mode selection switch 182 indicates reproduction (the reproduction mode), the release shutter button 180 does not become involved in any operations. In this case, regardless of whether the energy saving mode is set, the systems control section 20 switches to the energy saving mode after a predetermined amount of time has passed. The energy saving mode in the reproduction mode is a mode to perform key scanning, which monitors whether the signals 18a, 18b and/or 18c from the key operation section 18 have been supplied, and to monitor power supply. If there is a liquid crystal display section, omitted from the drawings, installed, the systems control section 20 in this mode controls to turn off the power supply to the display system related to a display on the liquid crystal display section.

When the power source switch 184 is turned on and the mode selection switch 182 indicates imaging (shooting mode), the systems control section 20 performs an operational control according to the status of the release shutter button 180 and to each of a plurality of states (modes) having the following measured time. First, if the release shutter button 180 has been fully depressed, the systems control section 20 controls the signal generating circuit 260 to generate a clock signal having a frequency higher than the normal clock signal and immediately begins an imaging sequence. In the imaging sequence, a preliminary imaging takes place as the shutter is operated on the digital camera 10 and an exposure parameter is generated; the AE drive and the CCD drive corresponding to the exposure parameter generated take place and the imaging signal 16d is obtained from the imaging section 16. After this, the imaging signal 16d goes through the preprocessing section 24 and the signal processing section 26 and is supplied to the storage section 34 as the image data 26c to be recorded there. This is the series of procedures that takes place.

The timer 22 begins to measure time when the imaging sequence ends or immediately after the power is turned on. When the predetermined amount of time has passed, the timer 22 outputs the no operation sensor signal 22a to the systems control section 20 to indicate that the time measuring has finished. During the predetermined amount of time, the systems control section 20 determines the device to be in the shoot preparation mode and controls in such a manner that the oscillation frequency is one that is commonly and generally used in cameras. In this mode, power is supplied to the imaging system related to imaging, and the key scanning and the monitoring of the power supply described earlier are controlled. If the liquid crystal display section is installed, the systems control section 20 supplies power according to the user setting that has been set beforehand.

When the release shutter button 180 is fully depressed in this mode, the imaging sequence described above operates on a high-speed clock signal, which allows an imaging scene to be shot precisely without being missed. The systems control section 20 controls these operations whose top priority is imaging and that take place starting with the shoot preparation mode to when the imaging begins.

When the time measuring is completed and the no operation sensor signal 22a is supplied to the systems control section 20, the systems control section 20 controls to switch to the energy saving mode within the shooting mode, as indicated by an arrow. The operation to switch modes after a predetermined amount of time has passed takes place when the energy saving mode is not the set mode. In this energy saving mode, the power supply monitoring and key scanning are utilized but power to other systems is turned off. At the same time, the systems control section 20 controls to have the signal generating circuit 260 output the reference clock, i.e. the lowest frequency, for example. By restraining the power supply itself and reducing the frequency, the power consumption in this mode can be diminished significantly.

In contrast, if the energy saving mode is set to function within the shooting mode, the imaging sequence begins when the release shutter button 180 is fully depressed. However, when the digital camera 10 is in the energy saving mode, the systems control section 20 allows the imaging sequence to take place after power supply is resumed. The systems control section 20 controls to switch to the energy saving mode as soon as the imaging sequence ends. By operating in this manner, an imaging control with the greatest emphasis on minimizing power consumption can be executed.

By controlling and causing the digital camera 10 to operate in this way depending on whether the energy saving mode is set, the systems control section 20 can cause the digital camera 10 to have two contradictory functions of giving a priority to imaging scenes and of restraining power consumption.

Although a pan focus camera has been described in the present embodiment, needless to say the present invention's application is not limited to such a camera and would allow a precise imaging while also reducing power consumption in any camera in which a half depression of the release shutter button 180 is possible and that at least has an AE locking function when the shutter button 180 is half depressed.

With a structure as described above, the digital camera 10 is able to have two contradictory functions of giving a priority to imaging scenes and of restraining power consumption through the following: the oscillation frequency, which is generated in the signal generating circuit by taking into account the operation signal supplied when an operator performs a key operation and the measurement of the predetermined amount of time using a timer is controlled; the signal of the oscillation frequency generated is supplied to the systems control section 20 as the clock signal; and the camera is operated based on whether the energy saving mode is set.

The digital camera device according to the present invention restrains power consumption and achieves a long drive for the camera, while at the same time capturing images without missing any imaging opportunities by precisely imaging the imaging scene desired by the operator and controlling the power supply, and these are achieved through the following: it receives in the systems control device the operation signal from the operating device; it measures the passage of the predetermined amount of time until the operation signal is supplied while measuring time with the time measuring device; it controls the clock generating device to generate an oscillation frequency higher than normal in response to the pressing operation of the shutter button in the imaging mode; it supplies the oscillation frequency generated to the systems control device; it controls to generate a normal oscillation frequency within the predetermined amount of time; it continues to monitor the operation signal depending on the result of measuring the passage of predetermined amount of time with the time measuring device, while at the same time controlling to generate a frequency lower than the normal oscillation frequency and reducing the power supply; and it increases the operation speed of the camera according to the pressing operation of the shutter button.

The embodiment above describes preview display, but index printing in which a plurality of thumbnail images are printed can be processed similarly. When an automatic index printing is selected, thumbnail images that have not been index printed can be printed first.

In the embodiment described above, various circuits are constructed in hardware. However, functions equivalent to the various circuits can be constructed through software.

What is claimed is:

1. A digital camera in which the timing to take in incident light from a field is made to correspond to an operation of a shutter button by an operator in order to convert the incident light into an electrical signal, the electrical signal is output as an imaging signal, and image data obtained by digitizing the imaging signal are rendered a signal processing, the digital camera comprising:

an operating device that operates the camera including the shutter button;

an automatic exposure (AE) drive circuit;

a charge coupled device (CCD) drive circuit;

a signal processing section comprising a clock generating device that generates a clock signal having one of a plurality of oscillation frequencies each corresponding to an operation of the operating device, wherein the signal processing section also supplies various parameters found by the signal processing section;

a time measuring device that measures time depending on the operation resulting from the operator operating the operating device; and a systems control device that determines an operational state of the camera based on whether or not operation signals that indicate operations of the operating device are present and that controls the clock generating device and the power supply of the camera, the systems control device using the various parameters supplied by the signal processing section to generate control signals that are supplied to and operate the AE drive circuit and the CCD drive circuit based on the clock signal, wherein the signal processing section further comprises an evaluation value calculation section that calculates the various parameters supplied to the systems control device based on image data supplied to the signal processing section, wherein the systems control device performs an actual imaging control to generate, in an imaging mode that includes a sequence to output, convert and record imaging signals as image data and in response to a depressing operation of the shutter button, the clock signal having an oscillation frequency higher than a normal oscillation frequency from among the plurality of oscillation frequencies generated by the clock generating device, a normal control to generate, in an imaging preparation mode, the clock signal having the normal oscillation frequency in a period after the actual imaging control or in a period starting from an initial power supply until a predetermined amount of time has passed, and an energy saving control to generate the clock signal having a frequency lower than the normal oscillation frequency while continuing monitoring the operation signals upon passage of the predetermined amount of time.

2. A digital camera according to claim 1, wherein the operating device further includes a power supply selection device that selects a power supply or a power shut-off to the apparatus, and an operational mode selection device that selects operation modes that represent general terms of processing procedures performed in association of operations that operate the apparatus.

3. A digital camera according to any one of claim 1 or claim 2, wherein the shutter button has only a fully depressing function to initiate operation of an imaging system.

4. A digital camera according to claim 1, wherein the systems control device monitors only an operation signal from the power supply selection device among the operation signals in the energy saving control.

5. A digital camera according to claim 1, wherein:

during the imaging preparation mode, the systems control device supplies power to an imaging system and to monitor the operation signals; and during the energy saving control, the systems control device supplies power only to monitor the operation signals.

6. A digital camera according to claim 1, wherein the evaluation value calculation section calculates a diaphragm value/shutter speed, a white balance adjustment value and a gray scale correction value.

* * * * *